Feb. 14, 1961     C. D. ORTH     2,971,348
THERMOSTATIC EXPANSION VALVE
Filed Sept. 6, 1957
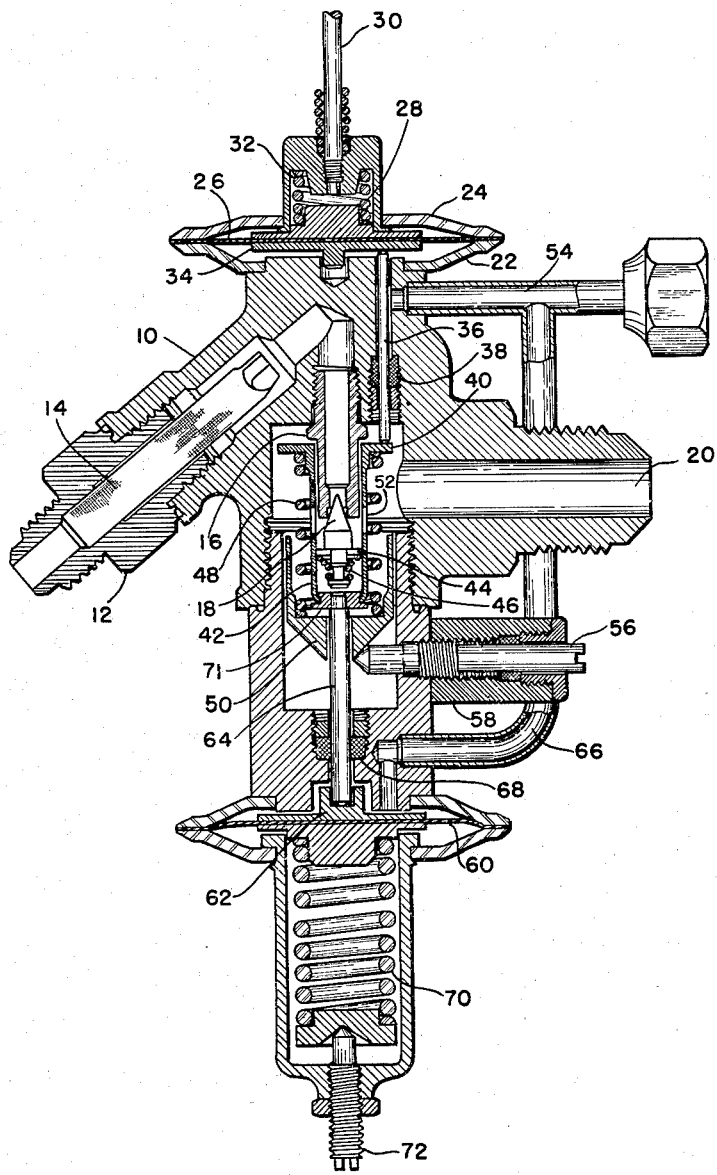
INVENTOR.
Charles D. ORTH
BY
John W. Michael 2,971,348
THERMOSTATIC EXPANSION VALVE

Charles D. Orth, Cedarburg, Wis., assignor to Controls Company of America, Schiller Park, Ill., a corporation of Delaware Filed Sept. 6, 1957, Ser. No. 682,405

7 Claims. (Cl. 62—212)

This invention relates to a thermostatic expansion valve designed to limit the minimum temperature of an evaporator which may be subjected to a decreasing load or which may be supplied by a compressor having an increasing capacity under certain conditions.

An automobile air conditioner is generally designed to have sufficient capacity to adequately cool the automobile in traffic or the like where the engine speed and, hence, speed of the compressor driven by the engine are quite apt to be low. Consequently, when the automobile is driven in the country at high engine speed the capacity of the system rises. In such a situation the normal thermostatic expansion valve will tend to shut off the refrigerant flow to the evaporator. However, when this happens and the compressor continues to run and the pressure underneath the thermal diaphragm is reduced so the diaphragm can now crack the valve open again and supply more refrigerant to the evaporator whereupon the evaporator temperature goes down further. This condition continues until the evaporator is so cold that it ices over and no air can be forced through the coils. This state having been reached the air conditioner is useless until the coils are thawed out. Another example of the type of situation in which the present valve is designed to operate would be a continuously running air conditioner subjected to a decrease in the load whereupon the load decreases the thermostatic expansion valve would close but the evaporator pressure would fall and permit the valve to open again and again the evaporator continues to cool off until it is frozen solid.

In both of the above instances it would be desirable to have some means of limiting the low temperature of the evaporator. The principal object of this invention is to provide a thermostatic expansion valve with such means for limiting the low temperature of the evaporator supplied by the valve.

The usual thermostatic expansion valve has a remote bulb sensing the temperature at the outlet of the evaporator and varying the pressure on one side of the thermal diaphragm to actuate the valve in accordance with the evaporator outlet temperature conditions. The bulb pressure acting on the diaphragm is generally opposed by evaporator pressure, either the valve outlet pressure (which is the same as the evaporator inlet pressure) or the evaporator outlet pressure by means of an external equalizer connection. In operation the thermal diaphragm will flex to close the valve when the evaporator temperature has reached the desired temperature. Continued operation of the compressor, however, will pull down the pressure in the evaporator so there is less force opposing the pressure exerted on the diaphragm by the bulb. In such a case the diaphragm will flex to open the valve even though the temperature is down as low as desired.

The present invention contemplates the addition of a temperature limiting diaphragm having one side subjected to the same pressure condition as the thermal diaphragm and the other side of the limiting diaphragm being acted upon by a spring. This diaphragm is normally not connected to the valve but upon reduction of the evaporator pressure to a predetermined low pressure value the spring acting on the limiting diaphragm overcomes the evaporator pressure acting on the limiting diaphragm and the limiting diaphragm becomes operatively engaged with the valve operating mechanism to cancel out the effect of the reduced pressure on the thermal diaphragm and at the same time oppose the bulb pressure with a constant spring force. Under these conditions the valve is restored to thermal operation rather than being subjected to modification of the thermal operation by reason of the falling evaporator pressure. This then has the effect of limiting the low temperature of the evaporator. In conjunction with automobile refrigeration the temperature maintained in the automobile can be adjusted merely by adjusting the force of the spring acting on the limiting diaphragm. This affords a very simple means for regulating the temperature and permits such regulation to be obtained without resorting to clutching the compressor.

Other objects and advantages will be pointed out in, or be apparent from, the specification and claims, as will obvious modifications of the single embodiment shown in the drawings, in which:

The single figure shows one form of the present invention.

Turning now to the drawings in detail, valve body 10 is provided with an inlet 12 which also serves to mount strainer 14. Valve seat 16 is threaded into the central bore of the valve body and valve 18 co-operates with the seat to regulate flow from the inlet to outlet 20. The outlet is connected to the evaporator inlet as is customary.

Mounted at the top of the valve body is lower diaphragm housing 22 and upper housing 24 with the diaphragm 26 mounted therebetween. Chamber 28 above the diaphragm is connected to the remote feeler bulb (not shown) through capillary tube 30 so the pressure of the charge within the bulb and chamber 28 will vary with temperature variations at the bulb. The bulb is customarily attached to the evaporator outlet. This pressure plus the force of compressed spring 32 bias the diaphragm 26 downwardly so the lower pad 34 acts on a plurality of push pins 36 (only one of which is shown) which pass through packing 38 to act on flange 40 of sleeve 42. Sleeve 42 is provided with a cage 44 on which valve 18 is mounted through the medium of conical spring 46 to provide for self-adjustment of the valve with respect to the seat. The valve is biased towards its seat by spring 48 compressed between sleeve flange 40 and cup 50.

When the thermal diaphragm 26 moves downwardly the valve 18 is opened and refrigerant may flow from inlet 12 past the valve and through lateral ports 52 in the sleeve and thence to outlet 20.

The valve illustrated is the externally equalized type of valve whereby conduit 54 connected to the space around push pin 36 communicates pressure at the evaporator outlet to the underside of diaphragm 26. This pressure is isolated by means of the packing 38 around push pin 36. In the normal course of operation of a conventional thermostatic expansion valve similarly externally equalized upon closure of valve 18 and continued operation of the compressor the pressure at the evaporator outlet (or at the evaporator inlet, for that matter) will continue to drop so the force on the underside of diaphragm 26 resulting from the evaporator pressure will drop. Since this pressure together with the force of spring 48 are the only forces normally opposing the bulb pressure the diaphragm would then move to open the valve even though this, in fact, is an unwanted condition. Bleeding in additional refrigerant at this time merely serves to lower the evaporator temperature below the desired temperature and permit the evaporator to start icing.

The present valve is provided with means for adjusting the superheat comprising slotted stem 56 projecting from fitting 58 to be turned to adjust the tip of the stem with respect to the conical underside of cup 50 to thereby vary the compression of spring 48 and thereby change the superheat setting of the valve in the conventional manner.

In the present valve the effects of the falling evaporator pressure either at the evaporator inlet or at the evaporator outlet after valve 18 has seated are controlled by means of the temperature limiting diaphragm 60 mounted at the bottom of valve body 10. The diaphragm pad 62 acts on pin 64 which normally does not contact valve 18. This diaphragm is biased by the external equalizer pressure in a downward direction (as viewed in the drawing) moving the pin 64 away from the valve. The equalizer pressure is communicated to the upper side of the limiting diaphragm 60 through conduit 66 and this pressure is confined to the chamber above the diaphragm by means of packing 68. Spring 70, mounted on the other side of the limiting diaphragm in opposition to the equalizer pressure on the upper side of the diaphragm, is overpowered or overcome by the pressure above the limiting diaphragm during the normal operation of the valve. However, after the valve 18 seats and the compressor continues to pull down the evaporator pressure the pressure above diaphragm 60 falls and when it falls below a predetermined value determined by the compression of the spring 70 the diaphragm will be moved upwardly by spring 70 so pin 64 will act on member 71 and sleeve 42 to exert a constant force on valve 18 in the closing direction. This force is in opposition to the force on the top of the thermal diaphragm due to bulb pressure. Therefore, the valve operation remains thermal in nature but rather than being subjected to a varying force opposing the bulb pressure a constant spring force is injected into the system. Under these conditions the valve will be opened only when the outlet temperature rises above the desired outlet temperature and the bulb pressure is sufficient to overcome spring 70.

It will be noted that the limiting diaphragm 60 substantially cancels the pressure variation effects under the thermal diaphragm 26 since the two diaphragms are substantially equal in size. In practice it may be desirable to make the limiting diaphragm slightly different in size in order to minimize any hunting effects or to provide operation combining the normal type operation and some effects of the present system.

It is also conceivable to replace spring 70 with a fixed dry gas charge in a sealed chamber to give a predetermined operating characteristic. As shown in the drawings, screw 72 can be turned to vary the compression of spring 70 and thereby vary the low temperature of the evaporator. This could be accomplished with a push-pull mechanism also, if desired. By making the spring adjustable the temperature maintained in an automobile having the type air conditioning system described above could be easily adjusted by merely adjusting the spring force acting on the limiting diaphragm.

As shown in the drawings the valve is externally equalized but the valve could be internally equalized. In such a case the packings 68, 38 around the push pins would be eliminated and the external equalizer connections 54, 56 would also be eliminated. The two diaphragms would then be subjected to valve outlet (or evaporator inlet) pressure rather than evaporator outlet pressure. The principle of operation would remain the same.

Although but one embodiment of the present invention has been illustrated and described, it will be apparent to those skilled in the art that various changes and modifications may be made therein without departing from the spirit of the invention or from the scope of the appended claims.

I claim:

1. A thermostatic expansion valve comprising, a valve body having an inlet and an outlet, the outlet being adapted for connection to a refrigeration evaporator, a valve seat and a valve located in the body, temperature responsive means including a diaphragm operatively connected to the valve for opening the valve when the response temperature increases and vice versa, one side of said diaphragm being subjected to evaporator pressure, and normally inoperative means operative upon reduction of the evaporator pressure to a preselected value to exert a closing force on the valve whereby the temperature responsive means retains control of the valve.

2. A thermostatic expansion valve comprising, a valve body having an inlet and an outlet, a valve seat between the inlet and the outlet, a valve cooperating with the seat for controlling flow between the inlet and the outlet, a diaphragm mounted on the valve body, means defining a variable volume chamber on one side of the diaphragm and including a bulb for sensing a remote temperature and thereby varying the pressure within the variable volume chamber to vary the force acting on the one side of the diaphragm, the other side of the diaphragm being subjected to an evaporator pressure, means connecting the diaphragm to the valve for actuating the valve in accordance with the temperature at the remote bulb, a second diaphragm mounted on the valve body, one side of said second diaphragm being subjected to an evaporator pressure, means exerting a predetermined force on the other side of said second diaphragm, the normally encountered evaporator pressures acting on said one side of said second diaphragm exerting a force sufficient to overcome said predetermined force acting on the other side of said diaphragm, and means connecting said second diaphragm to said valve only when the force acting on the one side of said second diaphragm is overcome by the predetermined force acting on the other side of said second diaphragm, said second diaphragm acting on the valve when connected thereto in a valve closing direction so that the pressure acting on one side of the first diaphragm is effectively opposed by the predetermined force.

3. A thermostatic expansion valve according to claim 2 in which the areas of the two diaphragms are approximately the same.

4. A thermostatic expansion valve according to claim 2 in which the predetermined force acting on said other side of said second diaphragm is adjustable.

5. A thermostatic expansion valve comprising, a valve body having an inlet and an outlet, a valve seat between the inlet and outlet, a valve cooperating with the seat for controlling flow between the inlet and the outlet, a diaphragm mounted on the valve body and connected to the valve, means including a feeler bulb and defining a variable volume chamber on one side of the diaphragm for exerting a force on the diaphragm in accordance with temperature induced pressure variations as sensed by the feeler bulb, the other side of the diaphragm being subjected to evaporator pressure, the diaphragm normally acting to actuate the valve to maintain a given temperature differential between the evaporator inlet and the evaporator outlet, a second diaphragm mounted on the valve body and having one side subjected to evaporator pressure, the other side of the second diaphragm being acted upon by a predetermined force, the force exerted by evaporator pressure on the one side of the second diaphragm normally overcoming the predetermined force, and means for engaging the second diaphragm with the valve only when the predetermined force acting on said other side of the second diaphragm overcomes the evaporator pressure, the bulb pressure being effectively opposed by the predetermined force upon engagement of the second diaphragm with the valve.

6. The combination according to claim 5 in which the temperature differential between the evaporator inlet and outlet may be adjusted, and including means independent of such adjustment for manually adjusting the predetermined force acting on the other side of the second diaphragm to thereby vary the minimum temperature of the evaporator.

7. A thermostatic expansion valve according to claim 5 in which the two diaphragms are approximately equal in area.

References Cited in the file of this patent

UNITED STATES PATENTS

| | | |
|---|---|---|
| 2,240,374 | Newton | Apr. 29, 1941 |
| 2,259,280 | Wile | Oct. 14, 1941 |
| 2,511,565 | Carter | June 13, 1950 |
| 2,529,378 | Dube et al. | Nov. 7, 1950 |